United States Patent
Wang et al.

(10) Patent No.: US 6,599,939 B2
(45) Date of Patent: Jul. 29, 2003

(54) STABILIZED LIPID COMPOSITION, PROCESS OF PREPARATION AND NUTRITIONAL PRODUCT CONTAINING IT

(75) Inventors: Junkaun Wang, Lausanne (CH); Raymond Bertholet, Blonay (CH)

(73) Assignee: Nestac S.A., Vevey (CH)

( * ) Notice: Subject to any disclaimer, the term of this patent is extended or adjusted under 35 U.S.C. 154(b) by 0 days.

(21) Appl. No.: 09/921,088

(22) Filed: Aug. 2, 2001

(65) Prior Publication Data

US 2002/0058702 A1 May 16, 2002

Related U.S. Application Data

(63) Continuation of application No. PCT/EP00/00908, filed on Feb. 7, 2000.

(30) Foreign Application Priority Data

Feb. 12, 1999 (EP) .............................. 99200395

(51) Int. Cl.⁷ ........................ A01N 37/00; A61K 47/00; A61K 9/00
(52) U.S. Cl. .......................... 514/558; 426/2; 426/801; 424/400; 424/439; 424/442
(58) Field of Search .............. 514/558; 426/2, 426/801; 424/400, 439, 442

(56) References Cited

U.S. PATENT DOCUMENTS

| | | | |
|---|---|---|---|
| 4,871,768 A | 10/1989 | Bistrain et al. | 514/547 |
| 5,686,131 A | 11/1997 | Sato et al. | 426/601 |
| 6,034,130 A | 3/2000 | Wang et al. | 514/558 |
| 6,099,871 A | * 8/2000 | Martinez | |

FOREIGN PATENT DOCUMENTS

| | | |
|---|---|---|
| EP | 0 893 064 | 1/1999 |
| WO | WO 89/02275 | * 3/1989 |

* cited by examiner

Primary Examiner—Christopher R. Tate
Assistant Examiner—Randall Winston
(74) Attorney, Agent, or Firm—Winston & Strawn

(57) ABSTRACT

A stabilized lipid composition of randomly interesterified triacylglycerols (TAGs) that includes, by weight of fatty acid components, long-chain polyunsaturated fatty acids (LC-PUFAs) having at least 20 carbon atoms and a degree of unsaturation of at least 4 and being present in a nutritionally beneficial amount but less than 5% by weight; and medium-chain saturated fatty acids (MC-SFAs) having six to fourteen carbon atoms and being present to promote absorption of the LC-PUFAs. The LC-PUFAs are mono-LC-PUFAs. Also, a nutritional product or infant food product that contains the lipid composition as a portion of the lipids therein, and methods to make such compositions and products.

14 Claims, No Drawings

STABILIZED LIPID COMPOSITION, PROCESS OF PREPARATION AND NUTRITIONAL PRODUCT CONTAINING IT

CROSS-REFERENCE TO RELATED APPLICATIONS

This application is a continuation of the U.S. national stage designation of International Application PCT/EP00/00908 filed Feb. 7, 2000, the content of which is expressly incorporated herein by reference thereto.

1. Technical Field

The invention relates to the field of the stabilization and absorption of lipids containing long-chain polyunsaturated fatty acids.

2. Background Art

Two long-chain polyunsaturated fatty acids (LC-PUFA), docosahexaenoic acid (DHA, C22:6, n-3) and arachidonic acid (AA, C20:4, n-6) are major LC-PUFAs in human milk fat. DHA is essential for the development of the brain and of sight and AA is associated with the immune function and with the growth of young children. That is why sources of these acids are added to infant products, in general in the form of mixtures of triacylglycerols (TAGs) enriched with the LC-PUFAs in question. These may be mixtures of concentrates of AA and DHA of fermentation origin or alternatively of a concentrate of AA of fermentation origin supplemented with fish oil predominantly containing DHA and, in a smaller quantity, eicosapentaenoic acid (EPA, C20:5 n-3).

LC-PUFAs are extremely sensitive to oxidation. Their oxidative degradation and the deterioration of the associated quality manifests itself by unpleasant odors and a reduction in the nutritional quality of the mixtures of TAGs.

It is described in U.S. Pat. No. 5,686,131 that the oxidative stability of the LC-PUFAs can be improved by the interesterification of an oil which is very rich in PUFA having a degree of unsaturation of at least 3 and of an oil containing long-chain saturated fatty acids, of C16 to C22 (LC-SFA). The product obtained has a high melting point, up to 80° C. due to the presence of a certain quantity of trisaturated TAGs, which makes it difficult to handle in a food production because of the high risk of oxidative deterioration during its melting which requires prolonged heating at high temperature. Furthermore, the TAGs containing only long-chain saturated fatty acids are absorbed more slowly than those which contain medium-chain saturated fatty acids (MC-SFAs). The LC-SFAs are only very slightly absorbed when they are at positions 1 and 3 of the TAGs. Because they form insoluble salts with calcium, these non-absorbed LC-SFAs induce a reduction in the absorption of calcium. Finally, the product of the inter-esterification is deodorized at high temperature, greater than 240° C., which is likely to generate trans fatty acids which are not recommended in dietetic applications.

Thus there is a need for improved compositions of such fatty acids.

SUMMARY OF THE INVENTION

The invention relates to a stabilized lipid composition of randomly interesterified triacylglycerols comprising, by weight of fatty acid components long-chain polyunsaturated fatty acids having at least 20 carbon atoms and a degree of unsaturation of at least 4 and being present in a nutritionally beneficial amount but less than 5% by weight; and medium-chain saturated fatty acids having six to fourteen carbon atoms and being present to promote absorption of the LC-PUFAs. Preferably, the TAGs containing LC-PUFAs almost exclusively are mono-LC-PUFA.

The LC-PUFAs predominantly comprise arachidonic acid, docosohexaenoic acid, eicosopentaenoic acid or mixtures thereof, with the AA and DHA being predominantly in the LC-PUFAs of the TAGs.

The MC-SFAs generally comprise coconut, basbassu or palm kernel fats or natural or synthetic medium chain triglycerides containing caproic acid, caprylic acid, capric acid, lauric acid, myristic acid or mixtures thereof. Thus, the MC-SFAs can have eight to ten carbon atoms, or ten to twelve carbon atoms.

The invention also relates to a nutritional product that contains lipids, wherein at least a portion of the lipids include the lipid composition of the invention. The lipids are present in the product in an amount of 15 to 35% by weight of dry matter, with the lipid composition of the invention preferably representing 5 to 50% of that amount.

The invention also relates to an infant food, which further comprises the nutritional product of the invention and one or more components of proteins, hydrolysed proteins, carbohydrates, vitamins and trace elements. This food may be in the form or a liquid or in dry form.

The invention also relates to a process for the preparation of lipid compositions of the invention. This process includes the steps of interesterifying a mixture of (A) 1 to 20% of an oil that is rich in LC-PUFAs having a degree of unsaturation of at least 4 and (B) 80 to 99% of an oil that is rich in MC-SFAs at a sufficient temperature ad for a sufficient time in the presence of a catalyst to form a product where fatty acids are randomly distributed on a glyceryl backbone; washing the product to remove alkaline and soap residues; refining the product by removing secondary products of the interesterification and traces of soap from the washed product; and deodorizing the refined product to obtain a deodorized, decolorized, stabilized lipid composition. Additional features of the process are described hereinbelow.

DETAILED DESCRIPTION OF THE PREFERRED EMBODIMENTS

The aim of the invention is to provide a stabilized lipid composition capable of providing the required quantity of LC-PUFA by an improved absorption without reducing the absorption of calcium, intended to be incorporated into a dietetic product without the latter undergoing oxidative or nutritional degradation because of this incorporation.

Thus, the stabilized lipid composition according to the invention consists of randomly interesterified TAGs comprising, by weight of fatty acid residues, less than 5% by weight of LC-PUFA as C20 and above, with a degree of unsaturation of 4 and above, comprising predominantly AA, DHA or EPA, and at least 80% by weight of MC-SFA as C6 to C14, where the TAGs containing LC-PUFAs consist practically exclusively of mono-LC-PUFA.

MC-SFA as C6 to C14 designates the medium-chain saturated fatty acids which are rapidly absorbed by the body, which do not form insoluble soaps with calcium as is the case with the LC-SFAs and which do not negatively influence the absorption of calcium. Lipids that contain these fatty acids are chosen from the natural or synthetic MC-TAGs containing caproic, caprylic, capric, lauric and myristic acids. Coconut, babassu and palm kernel fats also may be mentioned.

The process for preparing the stabilized lipid compositions of the invention preferably comprises the following steps:

the chemical interesterification of a mixture containing i) 1 to 20% of an oil rich in LC-PUFA having a degree of unsaturation of 4 and above containing the acids AA, DHA or EPA and ii) 80 to 99% of an oil rich in MC-SFA, is carried out in the presence of sodium ethoxide or methoxide as catalyst, so as to randomly redistribute the fatty acids on the glycerol backbone, the product of the reaction is washed with an aqueous medium so as to free it of the alkaline and soap residues, the washed product is refined by bringing into contact with an adsorbent which retains the traces of soap and of secondary products of the reaction and separating the adsorbent, and the refined product is deodorized by steam distillation at about 190° C. under vacuum, which leads to a deodorized, decolorized and stabilized oil.

The reaction is carried out so as to minimize the quantity of water present in the starting oil mixture. Thus, it is preferably dried at 80–85° C. under vacuum, for example of about 20 mbar, before the addition of the catalyst.

The catalyst should be fresh. Sodium methoxide or sodium ethoxide may be used, the latter being preferred. The quantity used is about 0.2% by weight, based on the starting mixture.

The starting oil mixture is heated up to the desired reaction temperature, preferably 80 to 90° C. before adding the catalyst. This addition is carried out with vigorous stirring in order to disperse the catalyst homogeneously. The reaction is preferably carried out under a vacuum of about 20 mbar, for about 30 min.

After the reaction, water is added to the reaction mixture in order to inactivate the catalyst and to wash the soap residues formed. A salt such as NaCl may be added to the aqueous medium, for example at a concentration of about 2% by weight, in order to avoid the formation of an emulsion which would result in loss of oil. This washing step may be repeated once or twice in order to reduce the concentration of soap below about 200 ppm.

To remove the traces of soap, the washed oil is treated with an absorbent, for example a silica gel, and the oil is decolorized with a bleaching earth, these operations being preferably carried out by bringing the oil into contact sequentially with the absorbent and separating the refined oil from the absorbents, for example by filtration.

The refined oil is then deodorized by steam distillation at about 190° C. for about 3 h under a high vacuum, for example of about 1 to 3 mbar. When desired, natural tocopherol may then be added as antioxidant.

The invention also relates to a nutritional product containing a lipid composition as defined above. It relates in particular to an infant food containing proteins, hydrolysed where appropriate, carbohydrates, lipids and where appropriate vitamins and trace elements, characterized in that it contains, by weight of dry matter, 15 to 35% of lipids of which 5 to 50% consist of the above lipid composition.

Nutritional product is understood to mean both a product for infant or adult clinical, for example enteral, nutrition and an infant food. Such a food may be prepared in liquid or powdered form with incorporation of the above lipid composition, by the wet mixing of the various constituents, followed by sterilization or pasteurization and aseptic packaging in the case of a liquid product or by drying, for example, spray-drying, or alternatively by dry mixing in the case of a powder.

EXAMPLES

The examples below illustrate the invention. In these, the parts and percentages are by weight, unless otherwise stated.

Example 1

The Following Formulation is Prepared

Chemical Interesterification 700 g of a lipid mixture containing 50 g of fish oil (at 24% DHA and 5% EPA), 14 g of oil source of AA (containing 53% AA), 636 g of MCT are randomly interesterified in the presence of 1.4 g of sodium ethoxide as catalyst at 85° C., with vigorous continuous stirring, under a 20-mbar vacuum for 30 min, in a 1000-ml jacketed reactor provided with an anchor-type stirrer and a thermometer. The reaction mixture is then washed, with moderate stirring, with 70 g of a hot aqueous solution containing 7 g of sodium chloride. The stirring is stopped after 2 min and the mixture is allowed to settle for 2 h. The heavy phase containing the water, the sodium chloride and the soaps formed upon decomposition of the catalyst is separated and removed. This washing operation is repeated until the soap content of the interesterified oil, determined by titration, is <200 mg/kg, which normally requires 2 to 3 washes.

Refining

The addition of 3.5 g of silica gel (Trisyl 300®) to the crude interesterified oil makes it possible to remove the soap residues. To this effect, the mixture is treated at 85° C., under a 20-mbar vacuum for 20 min. 1.4 g of bleaching earth (Tonsil Optimum FF®) and 0.7 g of filtration aid (Dicalite 4258S®) are then added and the mixture is decolorized for 20 min at 85° C., under a vacuum of 20 mbar. Finally, the mixture is filtered on a Buchner funnel at 50–60° C. 670 g of refined oil containing less than 1 mg of soap per kg are thus obtained.

Deodorization 300 g of the above refined oil are deodorized by steam distillation at 190° C. under a 1–2-mbar vacuum for 3 h and then the oil is filtered on a Buchner funnel at 50–60° C. The oil obtained can be protected from oxidation by addition of natural tocopherols.

Properties of the Interesterified Oil

The above refined and deodorized interesterified oil has a pale yellow color and is free of fish odor.

One important advantage of the above oil is that it can be treated in a process for manufacturing a finished food, directly from a cold storage room, for example at 4° C. without the need to temper it beforehand in a hot room for many hours. This advantage results from the fact that the oil remains in a clear liquid state even at low temperature and that its degradation can be minimized by avoiding heating it.

The purity of the above interesterified oil is much higher than that of a physical mixture of the same starting oils in the same proportions as is evident from the analyses of the polar fractions of the products of oxidative polymerization and degradation, by high-performance exclusion chromatography (HPSEC) and by p-anisidine values.

The results of the analysis of the fatty acids of the interesterified oil by gas chromatography of their methyl esters (fames) as well as of their distribution are indicated in Table 1 below:

TABLE 1

| Fatty acid | g fatty ac./100 g fatty ac. |
|---|---|
| C6:0 caproic | 0.49 |
| C8:0 caprylic | 53.32 |
| C10:0 capric | 40.24 |
| C12:0 lauric | 0.51 |
| C14:0 myristic | 0.18 |

TABLE 1-continued

| Fatty acid | g fatty ac./100 g fatty ac. |
| --- | --- |
| C16:0 palmitic | 1.06 |
| C18:0 stearic | 0.40 |
| C18:1 oleic | 0.73 |
| C18:2 linoleic | 0.16 |
| C18:3 linolenic | 0.07 |
| C20:4, n-6 arachidonic (AA) | 0.81 |
| C20:5, n-3 eicosapentaenoic (EPA) | 0.25 |
| C22:6, n-3 docosahexaenoic (DHA) | 1.07 |
| Others | 0.71 |
| Total | 100 |
| Total LC-PUFA (n > or = 4) | 2.13 |

To compare the interesterified oil with the physical mixture of the starting oils, their tocopherol content was balanced and their oxidative stability was determined in an accelerated oxidation test by storing at 40° C. To do this, 15 g of the fat to be analysed were placed in a 100-ml cylindrical flask, with an internal diameter of 42.4 mm, which was stoppered in ambient air and then placed in an oven at 40° C. The samples were kept for 1 d in the dark before carrying out the measurements.

The oxygen consumption (in the headspace and by the Oxitop method), the composition of the static space (ethane, pentane, ethylene), the peroxide value (POV), the loss of LC-PUFA (by gas chromatography, GC) as well as the formation of polar lipids were measured. All the results of these analyses showed concordantly the improved stability of the interesterified oil compared with the physical mixture of the starting oils.

In particular, by measuring the headspace gases, a substantial oxidation of the physical mixture was observed from the 55th day of storage whereas the interesterified oil remained stable up to the 75th day.

Furthermore, after 75 d of storage at 40° C., the peroxide value of the interesterified oil in a mixture of oils containing 2.13% of LC-PUFA corresponded to about 70% of that obtained for the physical mixture of the oils under the same conditions of use.

Moreover, the LC-PUFA losses (measured by GC) in the interesterified oil represented about 60% of those observed for the physical mixture after 75 d of storage at 40° C. A good correlation was observed with the increase in the polar lipids in a mixture of oils containing 2.13% of LC-PUFA, the percentage of polar lipids formed being for the physical mixture about 3× that observed in the case of the interesterified oil.

By way of comparison with respect to the state of the art represented by U.S. Pat. No. 5,686,131, the peroxide values were studied in a medium containing 11% of LC-PUFA (degree of unsaturation of 4 and above), as described in this document, by replacing the hydrogenated fat with the MCTs during the interesterification. Surprisingly, it was observed that after 13 d of storage at 40° C., the interesterified oil had a peroxide value approximately double that of the physical mixture and was consequently a lot less stable than the physical mixture. This shows that the interesterification in this case does not improve the stability but, on the contrary, damages it.

Example 2
The following formulation was prepared
A mixture of 95.1% of coconut oil, 2.7% of fish oil source of DHA and 2.2% of oil of a cellular organism source of AA is interesterified and then it is refined and the interesterified oil is deodorized by carrying out the procedure as in Example 1. Natural tocopherols were then added thereto as antioxidant.

The results of the analysis of the fatty acids of the interesterified oil by gas chromatography of their methyl esters (fames) as well as of their distribution are indicated in Table 2 below:

TABLE 2

| Fatty acid | g fatty ac./100 g fatty ac. |
| --- | --- |
| C6:0 caproic | 0.64 |
| C8:0 caprylic | 7.47 |
| C10:0 capric | 5.65 |
| C12:0 lauric | 44.88 |
| C14:0 myristic | 16.74 |
| C16:0 palmitic | 9.36 |
| C18:0 stearic | 2.99 |
| C18:1 oleic | 7.43 |
| C18:2 linoleic | 1.79 |
| C18:3 linolenic | 0.14 |
| C20:4, n-6 arachidonic (AA) | 1.12 |
| C20:5, n-3 eicosapentaenoic (EPA) | 0.13 |
| C22:6, n-3 docosahexaenoic (DHA) | 0.63 |
| Others | 1.03 |
| Total | 100 |
| Total LC-PUFA (n ≧ 4) | 1.88 |

This interesterified oil thus protected is used in an amount of 23% in a lipid composition for infant food constituting the lipid portion of this food, the remainder consisting of 77% of a mixture of palm olein, of soyabean oil and of sunflower oil with a high content of oleic acid. The measurement of the oxygen consumption, by the method of determining the decrease in the headspace pressure at 40° C., shows that this lipid composition is more stable than that containing the physical mixture at the same concentration.

What is claimed is:

1. A stabilized lipid composition of randomly interesterified triacylglycerols (TAGs) comprising, by weight of fatty acid components:
   long-chain polyunsaturated fatty acids (LC-PUFAs) having at least 20 carbon atoms and a degree of unsaturation of at least 4 and being present in a nutritionally beneficial amount but less than 5% by weight; and
   medium-chain saturated fatty acids (MC-SFAs) having six to fourteen carbon atoms and being present to promote absorption of the LC-PUFAs;
   wherein the TAGs containing LC-PUFAs almost exclusively are mono-LC-PUFA.

2. The composition of claim 1 wherein the LC-PUFAs predominantly comprise arachidonic acid (AA), docosohexaenoic acid (DHA), eicosopentaenoic acid (EPA) or mixtures thereof.

3. The composition of claim 2 wherein the AA and DHA are predominantly in the LC-PUFAs of the TAGs.

4. The composition of claim 1 wherein the MC-SFAs comprise coconut, basbassu or palm kernel fats or natural or synthetic medium chain triglycerides containing caproic acid, caprylic acid, capric acid, lauric acid, myristic acid or mixtures thereof.

5. The composition of claim 1 wherein the MC-SFAs have ten to twelve carbon atoms.

6. In a nutritional product that contains lipids, improvement where at least a portion of the lipids include the lipid composition of claim 1.

7. The nutritional product of claim 6, wherein the lipids are present in an amount of 15 to 35% by weight of dry matter, with the lipid composition of claim 1 representing 5 to 50% of that amount.

8. An infant food which further comprises the nutritional product of claim 7 and one or more components of proteins, hydrolysed proteins, carbohydrates, vitamins and trace elements.

9. The infant food of claim 8 in dry form.

10. A stabilized lipid composition of randomly interesterified triacyglycerols (TAGs) comprising, by weight of fatty acid components:
   long-chain polyunsaturated fatty acids (LC-PUFAs) having at least 20 carbon atoms and a degree of unsaturation of at least 4 and being present in a nutritionally beneficial amount but less than 5% by weight; and
   at least 80% by weight medium-chain saturated fatty acids (MC-SFAs) having six to fourteen carbon atoms and being present to promote absorption of the LC-PUFAs;
   wherein the TAGS containing LC-PUFAs almost exclusively are mono-LC-PUFA.

11. The composition of claim 10 wherein the MC-SFAs have eight to ten carbon atoms.

12. The composition of claim 11 wherein the LC-PUFAs predominantly comprise arachidonic acid (AA), docosohexaenoic acid (DHA), eicosopentaenoic acid (EPA) or mixtures thereof.

13. The composition of claim 10 wherein the MC-SFAs comprise coconut, basbassu or palm kernel fats or natural or synthetic medium chain triglycerides containing caproic acid, caprylic acid, capric acid, lauric acid, myristic acid or mixtures thereof.

14. An infant food which further comprises the nutritional product of claim 10 and one or more components of proteins, hydrolysed proteins, carbohydrates, vitamins and trace elements.

* * * * *

UNITED STATES PATENT AND TRADEMARK OFFICE
CERTIFICATE OF CORRECTION

PATENT NO. : 6,599,939 B2  Page 1 of 1
DATED : July 29, 2003
INVENTOR(S) : Wang et al.

It is certified that error appears in the above-identified patent and that said Letters Patent is hereby corrected as shown below:

Title page,
Item [75], Inventors, delete "Junkaun Wang, Lausanne (CH)" and insert -- Junkuan Wang, Lonay (CH) --.
Item [73], Assignee, delete "Nestac S.A." and insert -- Nestec S.A. --.

Column 7,
Line 9, delete "triacyglycerols" and insert -- triacylglycerols --; and
Line 18, delete "TAGS" and insert -- TAGs --.

Signed and Sealed this

Twenty-eighth Day of October, 2003

JAMES E. ROGAN
*Director of the United States Patent and Trademark Office*